United States Patent
Nam et al.

(10) Patent No.: US 8,861,489 B2
(45) Date of Patent: Oct. 14, 2014

(54) METHOD AND APPARATUS FOR TRANSMITTING ROUTER ADVERTISEMENT AND ROUTER SOLICITATION MESSAGES THROUGH ACCESS POINT

(75) Inventors: Sang-su Nam, Seoul (KR); Hye-eun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1691 days.

(21) Appl. No.: 11/655,929

(22) Filed: Jan. 22, 2007

(65) Prior Publication Data

US 2007/0171873 A1    Jul. 26, 2007

(30) Foreign Application Priority Data

Jan. 20, 2006  (KR) .................. 10-2006-0006286

(51) Int. Cl.
| | | |
|---|---|---|
| *H04W 4/00* | (2009.01) | |
| *H04J 1/16* | (2006.01) | |
| *H04W 40/24* | (2009.01) | |
| *H04W 36/00* | (2009.01) | |
| *H04W 28/06* | (2009.01) | |
| *H04W 48/08* | (2009.01) | |
| *H04W 88/00* | (2009.01) | |
| *H04W 80/04* | (2009.01) | |

(52) U.S. Cl.
CPC ...... *H04W 36/0011* (2013.01); *H04W 36/0016* (2013.01); *H04W 28/06* (2013.01); *H04W 48/08* (2013.01); *H04W 88/005* (2013.01); *H04W 40/246* (2013.01); *H04W 80/04* (2013.01)

USPC .......... 370/338; 370/331; 370/252; 370/256; 455/443; 455/445

(58) Field of Classification Search
USPC .......... 370/338, 331, 252, 256; 455/443, 445
See application file for complete search history.

(56) References Cited

U.S. PATENT DOCUMENTS

| | | | | |
|---|---|---|---|---|
| 6,307,843 | B1 * | 10/2001 | Okanoue ................... | 370/312 |
| 2002/0178235 | A1 * | 11/2002 | Ueno et al. ................ | 709/217 |
| 2003/0012179 | A1 * | 1/2003 | Yano et al. ................ | 370/352 |
| 2003/0144001 | A1 * | 7/2003 | Nakatsugawa et al. ....... | 455/445 |

(Continued)

FOREIGN PATENT DOCUMENTS

| | | | |
|---|---|---|---|
| JP | 2000-092562 | * | 3/2000 |
| JP | 2000-92562 A | | 3/2000 |

(Continued)

OTHER PUBLICATIONS

Japanese Office Action, dated Aug. 16, 2011, issued in Application No. 2007-010708.

(Continued)

*Primary Examiner* — Ariel Balaoing
(74) *Attorney, Agent, or Firm* — Sughrue Mion, PLLC (57) ABSTRACT

A method and apparatus for transmitting a message in a wireless network environment are provided. The method of computing an interval of message transmission in an access point located in a specific subnet, includes determining whether the access point is an edge access point located at a boundary between the specific subnet and a neighboring subnet, and computing an interval of transmission of a router advertisement (RA) message containing information regarding the specific subnet based on the determination result.

12 Claims, 9 Drawing Sheets

(56) References Cited

U.S. PATENT DOCUMENTS

| | | | |
|---|---|---|---|
| 2005/0053011 A1 | 3/2005 | Ohbayashi et al. | |
| 2005/0117590 A1* | 6/2005 | Ronneke | 370/395.52 |
| 2006/0140177 A1* | 6/2006 | Karhu | 370/356 |
| 2006/0182038 A1* | 8/2006 | Nalawade et al. | 370/252 |

FOREIGN PATENT DOCUMENTS

| | | |
|---|---|---|
| JP | 2000-092562 A | 3/2000 |
| JP | 2003-224874 A | 8/2003 |
| KR | 10-2005-00505 A | 5/2005 |

OTHER PUBLICATIONS

Daley B Pentland Monash University Ctie E Nordmark Sun Microsystems G: "Deterministic Fast Router Advertisement Configuration; draft-dealy-dna-det-fastra-00.txt", Jul. 12, 2004, XP015012172, ISSN: 0000-0004.

De Marco G et al., "Comparison of RA Beaconing Techniques in Mobile IPv6", Database and Expert Systems Applications, 2005. Proceedings. Sixteenth International Workshop Copenhagen, Denmark Aug. 22-26, 2005, Piscataway, NJ, USA, IEEE, Aug. 22, 2005, pp. 106-110 XP010835573 ISN: 978-0-7695-2424-5.

European Search Report issued in corresponding European Application No. 07100561.5, dated Jan. 30, 2012.

Japanese Office Action issued in corresponding Japanese Application No. 2007-010708, dated Aug. 16, 2011.

Jinhyeock Choi Dongyun Shin Samsung AIT: "Fast Router Discovery with RA Caching in AP <draft-jinchoi-mobileip-f rd-00.txt>; draft-jinchoi-mobileip-frd-00.txt", Feb. 1, 2003, XP015003811, ISSN: 0000-0004.

Extended European Search Report dated Sep. 17, 2013, issued by the European Patent Office in counterpart European Application No. 13162953.7.

Choi et al., "Fast Router Discovery with RA Caching; draft-jinchoi-dna-frd-00.txt", Jul. 12, 2004, XP015030539, ISSN: 0000-0004, 12 pages total.

Choi et al., "Fast Router Discovery with L2 support; draft-ietf-dna-frd-00.txt", Oct. 13, 2005, XP015042346, ISSN: 0000-0004, 20 pages total.

* cited by examiner

METHOD AND APPARATUS FOR TRANSMITTING ROUTER ADVERTISEMENT AND ROUTER SOLICITATION MESSAGES THROUGH ACCESS POINT

CROSS-REFERENCE TO RELATED PATENT APPLICATIONS

This application claims the priority of Korean Patent Application No. 10-2006-0006286, filed on Jan. 20, 2006, in the Korean Intellectual Property Office, the disclosure of which is incorporated herein in its entirety by reference.

BACKGROUND OF THE INVENTION

1. Field of the Invention

The present invention relates to a method and apparatus for transmitting messages in a radio network environment, and more particularly, to a method and apparatus for effectively transmitting messages in a radio network environment according to a mobile internet protocol (MIP).

2. Description of the Related Art

As the performances of mobile nodes, such as notebook computers and personal digital assistants (PDAs) have been improved and mobile communication technologies have been developed, the number of mobile node users has significantly increased. Accordingly, a mobile internet protocol (MIP) that uses an internet protocol (IP) address as a mobile node identifier has been introduced. In particular, MIP is a technology whereby even if the location of a mobile node is changed, a node can continuously communicate with a mobile node by using the IP address of the mobile node.

Figure 1:
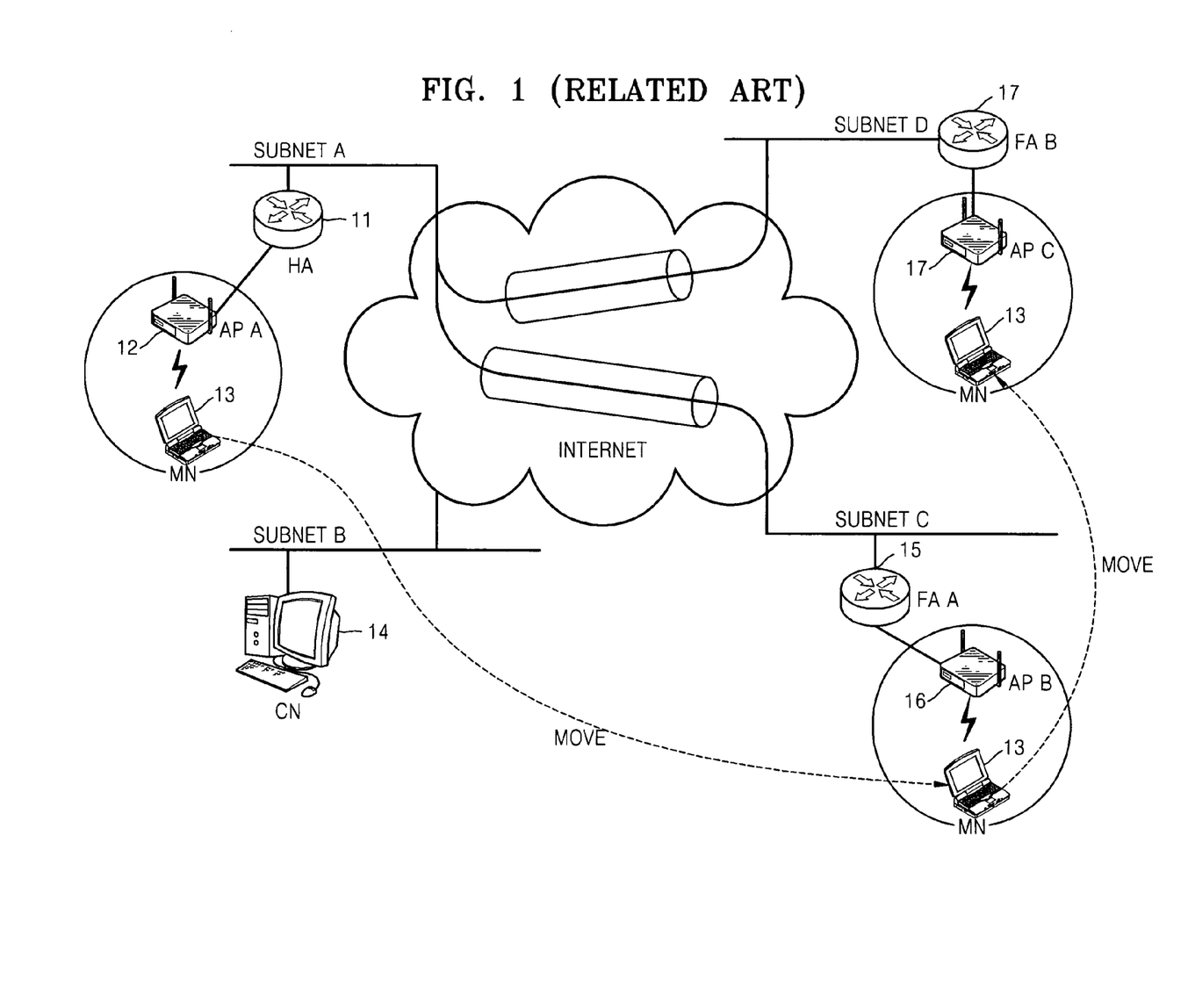
FIG. 1 is a diagram of a related art wireless network environment.

FIG. 1 is a diagram of a related art wireless network environment. Referring to FIG. 1, the related art wireless network environment includes a home agent (HA) 11, an access point (AP) A 12, a mobile node (MN) 13, a correspondent node (CN) 14, a foreign agent (FA) A 15, an AP B 16, a FA B 17, and an AP C 18.

Each of the HA 11, the FA A 15, and the FA B 17, which are a type of access router (AR), manages a subnet in which it is located. That is, the HA 11 manages a subnet A, the FA A 15 manages a subnet C, and the FA B 17 manages a subnet D. The AP A 12, the AP B 16, and the AP C 18 communicate with ARs, such as the HA 11, the FA A 15, and the FA B 17, by wire, and communicate with the MN 13 wirelessly to connect the MN 13 to a wired network.

When the CN 14 transmits a packet using the IP address of the MN 13 as a destination address, the packet is processed according to the MIP, as follows. If the MN 13 is located in the subnet A managed by the HA 11, the packet arrives at the MN 13 via the HA 11 and the AP A 12. However, if the MN 13 leaves the subnet A and is then located in the subnet C managed by the FA A 15, the HA 11 intercepts the packet and delivers it to the FA A 15 by tunneling. In this case, the current IP address of the MN 13, which is referred to as a COA (Care Of Address), becomes different from the original IP address thereof. In order to perform tunneling, the HA 11 must recognize the COA of the MN 13. Thus, the MN 13 transmits a binding update message containing information, such as the COA of the MN 13, to the HA 11. Similarly, the packet is processed as described above when the MN 13 leaves the subnet C and is moved to the subnet D managed by the FA A 17.

Figure 2:
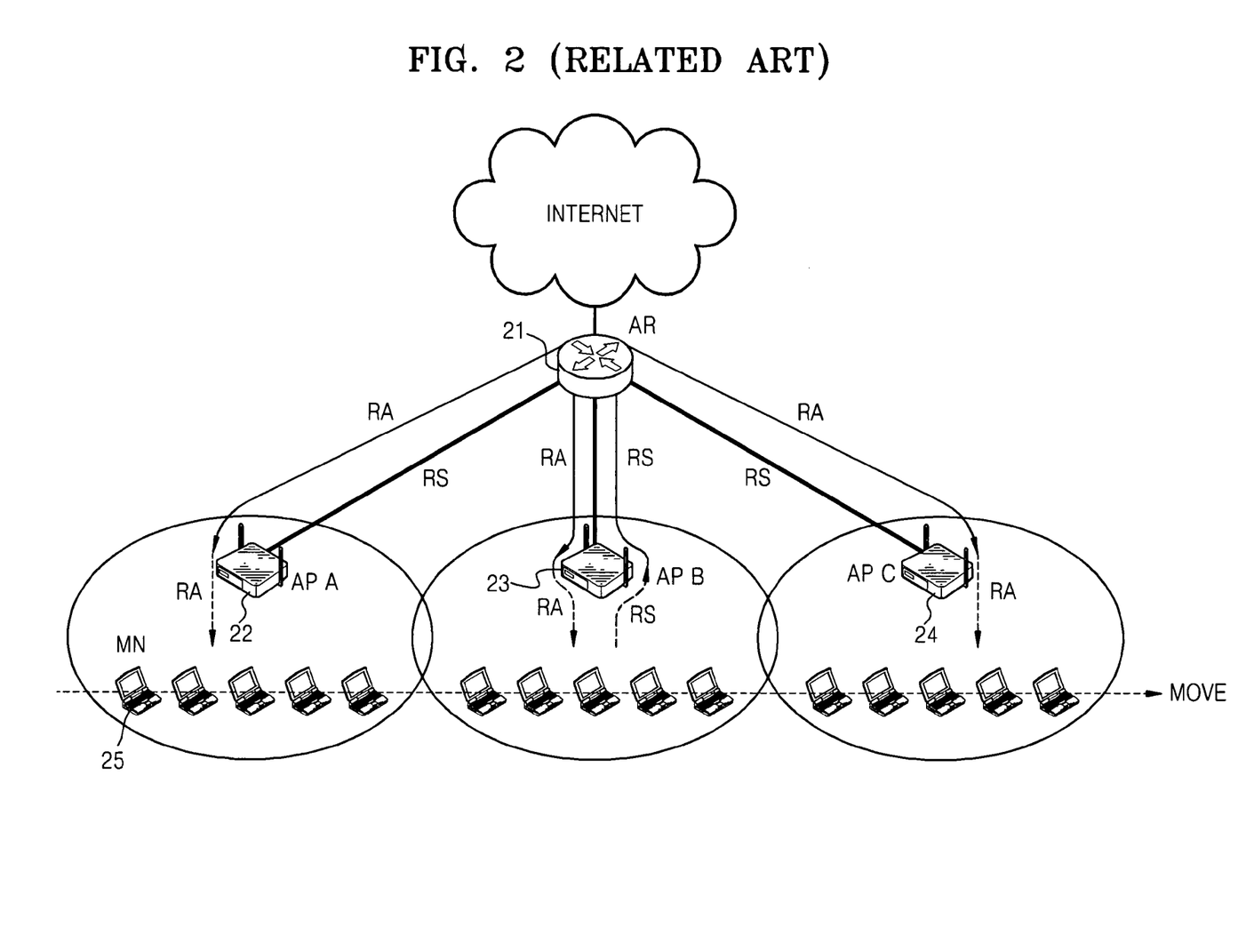
FIG. 2 is a diagram illustrating a handover process in a related art wireless network environment.

FIG. 2 is a diagram illustrating a handover process in a related art wireless network environment. Referring to FIG. 2, an MN 25 sequentially passes through a cell managed by an AP A 22, a cell managed by an AP B 23, and a cell managed by an AP C 24. The MN 25 must generate a COA for use in a subnet in which it is now located in order that the MN 25 can communicate with other nodes while moving in a subnet managed by an AR 21, the COA containing a subnet prefix. Thus, the MN 25 must have information regarding the subnet to generate the COA.

Thus, the AR 21 periodically broadcasts a router advertisement (RA) message containing the information regarding the subnet. Also, the MN 25 may transmit a router solicitation (RS) message requesting transmission of the RA message. However, the RA message that is periodically broadcast is rebroadcast to the MN 13 by the AP A 22, the AP B 23, or the AP C 24 that wirelessly receive the RA message from the AR 21. In this case, unlike wired resources, wireless resource bandwidth for a wireless channel is significantly limited, and thus, broadcasting of the RA message causes serious waste of wireless channel bandwidth.

In particular, if a large amount of time is needed to perform a handover process in which the MN 25 moves from a subnet managed by the AR 21 to a new subnet, communications established with the MN 25 is discontinued, thereby degrading the communication performance of the MN 25. Thus, the handover process must be expedited. However, when a transmission interval during which the RA message is transmitted is shortened to expedite the handover process, waste of wireless channel bandwidth becomes worse. Also, when the MN 25 transmits the RS message and the RA message is broadcast in response to the RS message, waste of wireless channel bandwidth is substantial.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for guaranteeing smooth handover to a mobile node while reducing waste of wireless channel bandwidth caused by broadcasting a router advertisement (RA) message.

The present invention also provides a computer readable medium having recorded thereon a computer program for executing the above method.

According to an aspect of the present invention, there is provided a method of computing an interval of message transmission in an access point located in a specific subnet, the method comprising determining whether the access point is an edge access point located at a boundary between the specific subnet and a neighboring subnet, and computing an interval of transmission of a first message containing information regarding the specific subnet based on the determination result.

According to another aspect of the present invention, there is provided an apparatus for computing an interval of message transmission in an access point located in a specific subnet, the apparatus comprising a determination unit which determines whether the access point is an edge access point located at a boundary between the specific subnet and a neighboring subnet, and a computing unit which computes an interval of transmission of a first message containing information regarding the specific subnet based on the determination result from the determination unit.

According to another aspect of the present invention, there is provided a computer readable medium having recorded thereon a computer program for the above method.

According to another aspect of the present invention, there is provided a method of transmitting a message in an access point located in a specific subnet, the method comprising determining whether the access point is an edge access point located at a boundary between the specific subnet and a neighboring subnet, computing an interval of transmission of a first message containing information regarding the specific subnet, based on the determination result, and transmitting the first message at the computed interval.

According to another aspect of the present invention, there is provided an apparatus for transmitting a message in an access point located in a specific subnet, the apparatus comprising a determination unit which determines whether the access point is an edge access point located at a boundary between the specific subnet and a neighboring subnet; a computing unit which computes an interval of transmission of a first message containing information regarding the specific subnet, based on the determination result; and a transmitter which transmits the first message at the computed interval.

According to another aspect of the present invention, there is provided a computer readable medium having recorded thereon a computer program for the above method.

According to another aspect of the present invention, there is provided a method of transmitting a message in an access point located in a specific subnet, the method comprising receiving a second message from a mobile node, the second message requesting a first message containing information regarding the specific subnet, when the second message is received, measuring an amount of time elapsed from a point of time when the first message stored in the access point has been received, and selectively transmitting the first message based on the elapsed amount of time.

According to another aspect of the present invention, there is provided an apparatus for transmitting a message in an access point being located in a specific subnet, the apparatus comprising a receiver which receives a second message from a mobile node, the second message requesting a first message containing information regarding the specific subnet, a measurement unit which measures an amount of time elapsed from a point of time when the first message stored in the access point has been received, when the second message is received, and a transmitter which selectively transmits the first message based on the elapsed amount of time.

According to another aspect of the present invention, there is provided a computer readable medium having recorded thereon a computer program for the above method.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 3:
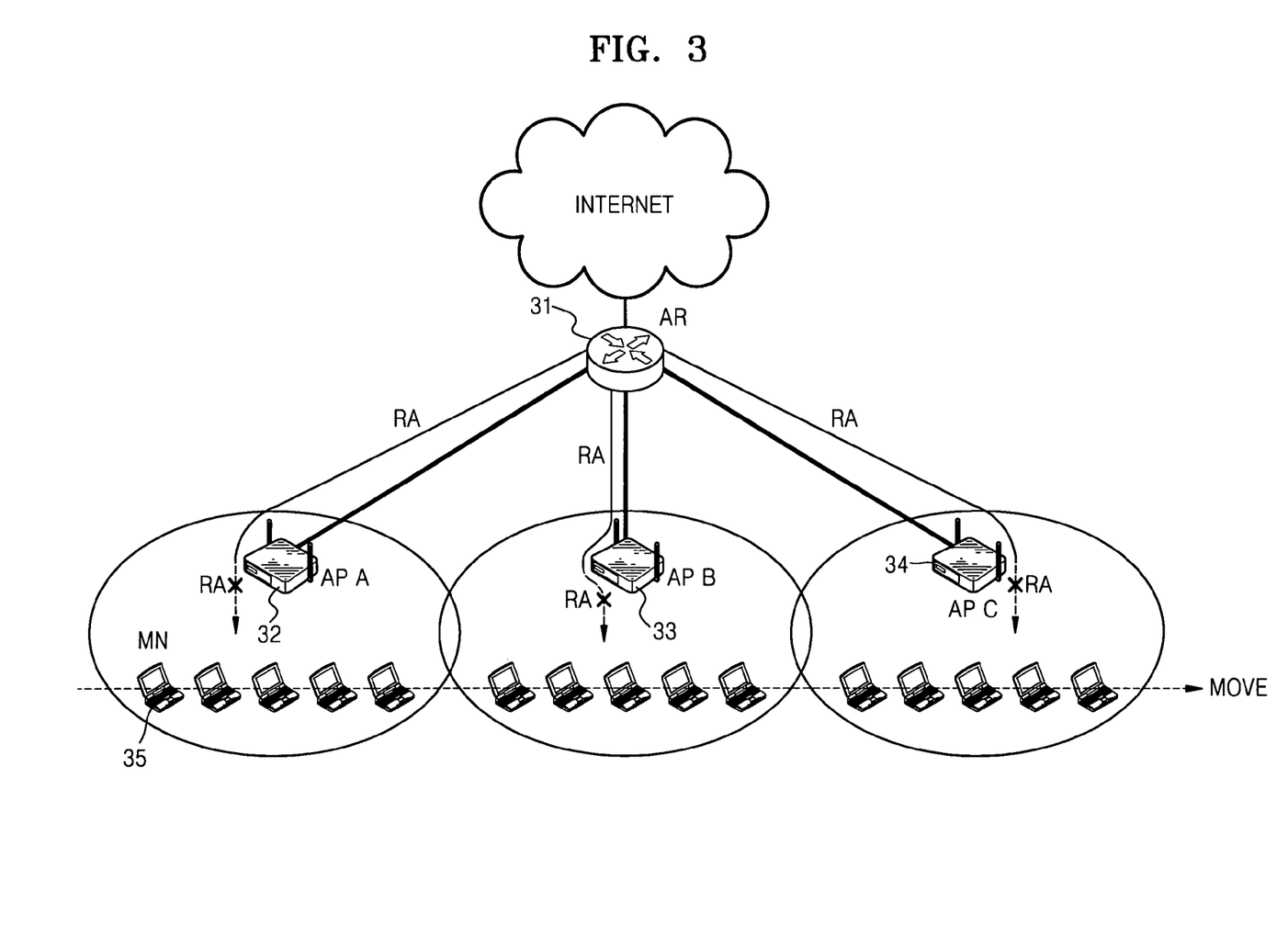
FIG. 3 is a diagram illustrating a handover process in a wireless network environment according to an exemplary embodiment of the present invention.

FIG. 3 is a diagram illustrating a handover process performed in a wireless network environment according to an exemplary embodiment of the present invention. Referring to FIG. 3, a mobile node (MN) 35 sequentially passes through a cell managed by an access point (AP) A 32, a cell managed by an AP B 33, and a cell managed by an AP C 34. To prevent wireless channel bandwidth from being wasted due to periodically broadcasting a router advertisement (RA) message, the AP A 32, the AP B 33, and the AP C 34 hold the RA message without broadcasting it, when they receive the RA message from an access router (AR) 31. Next, each of the AP A 32, the AP B 33, and the AP C 34 sets a transmission interval at which the RA message is transmitted to reduce the amount of wireless channel traffic, and transmits the RA message in the transmission interval. That is, each of the AP A 32, the AP B 33, and the AP C 34 sets the transmission interval as long as possible so as to efficiently use wireless channel bandwidth. However, if handover occurs due to movement of the MN 35 to a new subnet from a subnet managed by the AR 31, the transmission interval is reduced to guarantee the communication quality of the MN 35.

Figure 4:
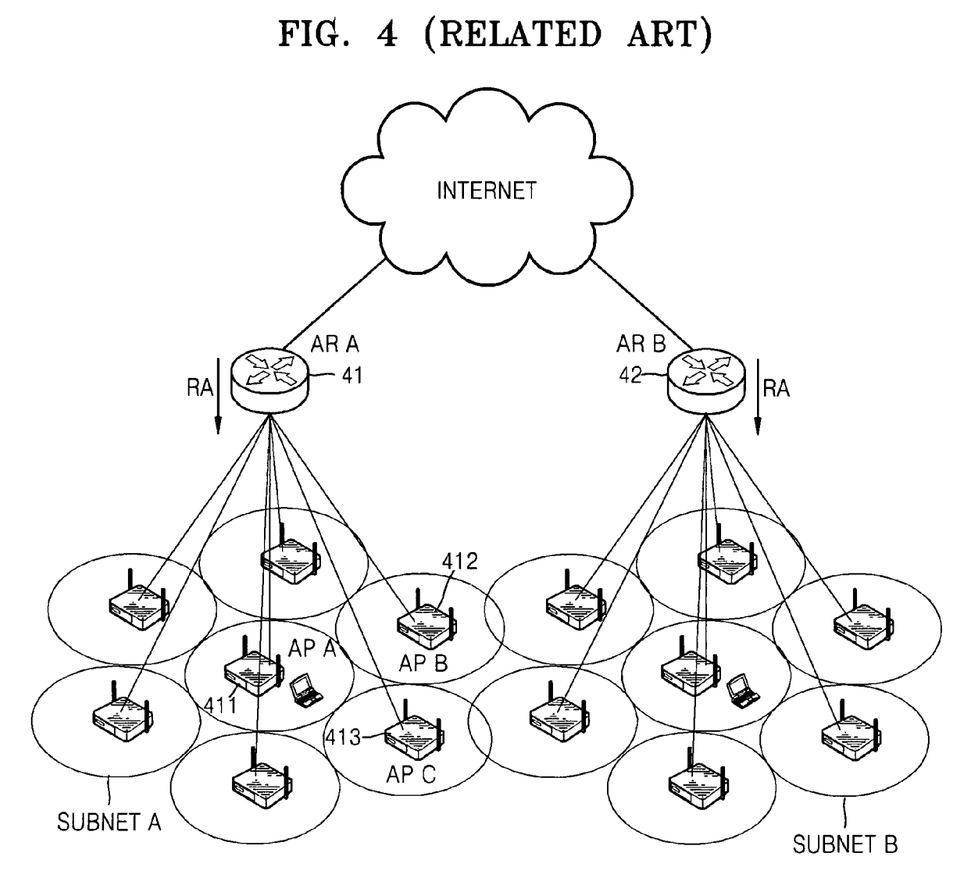
FIG. 4 is a diagram of a related art wireless network environment established between access routers (ARs)

FIG. 4 is a diagram illustrating a related art wireless network environment established between ARs A 41 and B 42. Referring to FIG. 4, in the related art wireless network environment, a subnet A managed by the AR A 41 is designed to partially overlap a neighboring subnet B managed by the AR B 42. The overlap is designed to prevent a discontinuity in communications between mobile nodes.

Conventionally, upon receiving an RA message from the ARs A 41 and B 42, APs broadcast it immediately, and therefore, all of the APs in the subnet A transmit the RA message at the same time. However, even if a mobile node located in a cell managed by an AP A 411 in the center of the subnet A moves in the cell, handover does not occur, and thus, a reduction in a transmission interval at which the RA message is transmitted causes waste of wireless channel bandwidth. In contrast, if a mobile node located in a cell managed by APs B 412 and C 413 on the edge of the subnet A moves in the cell, handover is very likely to occur, and thus, smooth handover is not guaranteed if the transmission interval of the RA message is increased.

Figure 5:
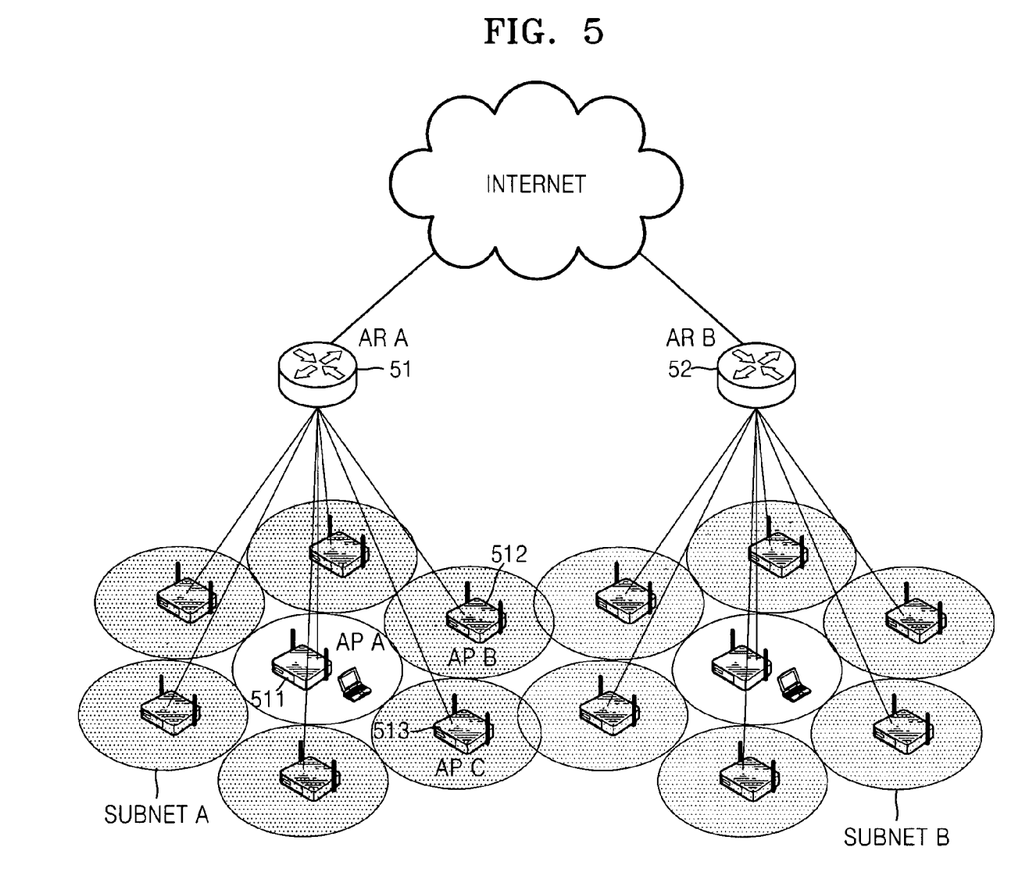
FIG. 5 is a diagram of a wireless network environment established between ARs according to an exemplary embodiment of the present invention.

FIG. 5 is a diagram of a wireless network environment established between ARs according to an exemplary embodiment of the present invention. Referring to FIG. 5, the wireless network environment is designed based on the wireless network environment of FIG. 3, in which all APs store a RA message from an AR A 51 or an AR B 52 without broadcasting it.

In particular, even if a mobile node located in a cell managed by an AP A 511 in the center of a subnet A moves in the cell, handover does not occur, and thus, the AP A 511 increases a transmission interval in which the RA message is transmitted. In contrast, if a mobile node located in a cell managed by an edge AP B 512 and an edge AP C 513 in the subnet A moves in the cell, handover is very likely to occur, and thus, the edge AP B 412 and edge AP C 413 reduces the transmission interval of the RA message.

Figure 6:
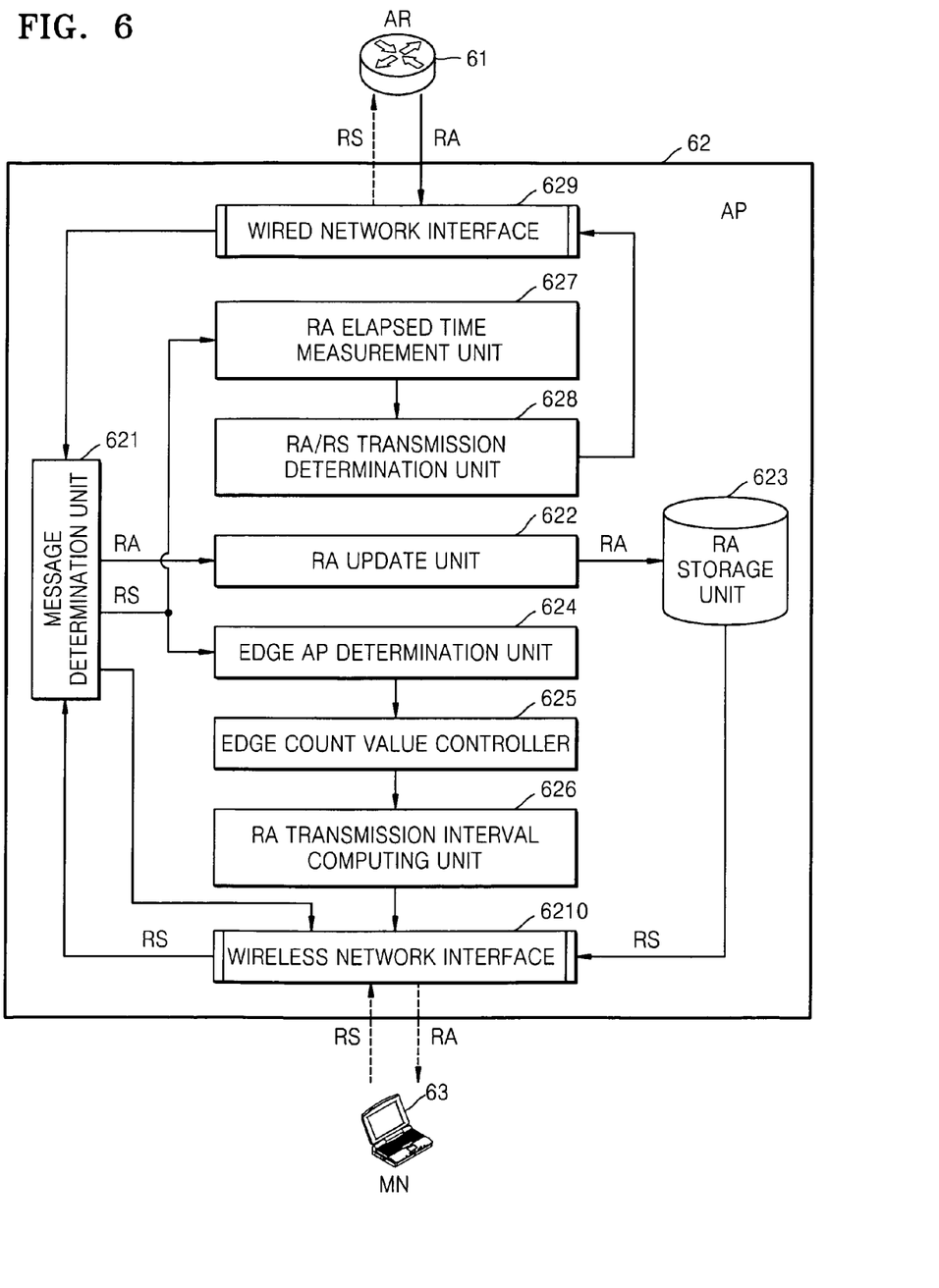
FIG. 6 is a block diagram of an apparatus that transmits and receives a router advertisement (RA) message and a router solicitation (RS) message, according to an exemplary embodiment of the present invention.

FIG. 6 is a block diagram of an apparatus that receives and transmits an RA message and a router solicitation (RS) message according to an exemplary embodiment of the present invention. Referring to FIG. 6, the apparatus is included in an AP 62 that manages one of a plurality of cells constituting a subnet. The apparatus includes a message determination unit 621, an RA update unit 622, an RA storage unit 623, an edge AP determination unit 624, an edge count value controller 625, an RA transmission interval computing unit 626, an RA elapsed time measurement unit 627, an RA/RS transmission determination unit 628, a wired network interface 629, and a wireless network interface 6210.

The message determination unit 621 determines the type of message received via the wired network interface 629 or the wireless network interface 6210. The message determination unit 621 also determines whether the message received via the wired network interface 629 is an RA message that contains information regarding a subnet or whether the message received via the wireless network interface 6210 is an RS message requesting the RA message. The RA message is provided by an AR 61 and contains information regarding a subnet A. The RS message is transmitted to request the RA message.

Also, when the message determination unit 621 determines that the message received via the wired network interface 629 is an RA message, the message determination unit 621 compares the received RA message with an RA message stored in the AP 62, i.e., an RA message stored in the RA storage unit 623, and determines whether the original RA message has been changed according to the comparison result. That is, the message determination unit 621 compares the RA message received via the wired network interface 629 with an RA message stored in the RA storage unit 623, and determines that the original RA message has been changed when the received RA message is different from the stored RA message.

When the message determination unit 621 determines that the message received via the wired network interface 629 is an RA message, the RA update unit 622 updates the RA message stored in the RA storage unit 623 with the received RA message.

When the message determination unit 621 determines that the message received via the wired network interface 629 is an RS message, the edge AP determination unit 624 determines whether the AP 62 is an edge AP located at the boundary between the subnet A and a neighboring subnet, based on the information contained in the received RS message. In particular, according to an exemplary embodiment of the present invention, the edge AP determination unit 624 determines whether the AP 62 is an edge AP located at the boundary between the subnet A and the neighboring subnet, based on the source address of the received RS message, i.e., the address of a site where the received RS message is transmitted.

If the AP 62 is an edge AP located at the boundary between the subnet A and the neighboring subnet, the AP 62 may receive a RS message from a mobile node in the subnet A or a mobile node in the neighboring subnet. However, if the AP 62 receives the RS message from the mobile node in the neighboring subnet, the subnet of the source address of the RS message is different from the subnet A in which the AP 62 is located. Specifically, the edge AP determination unit 624 compares the subnet of the source address of the RS message with the subnet A in which the AP 62 is located, and determines that the AP 62 is an edge AP located at the boundary between the subnet A and the neighboring subnet when the subnets are not the same.

Whenever the edge AP determination unit 624 determines that the AP 62 is an edge AP, the edge count value controller 625 increases an edge count value indicating the number of boundaries, between neighboring subnets and the subnet A, at which the AP 62 is located. A large edge count value indicates that the AP 62 receives RS messages from mobile nodes being respectively located in a large number of neighboring subnets of the subnet A, and a small edge count value indicates that the AP 62 receives RS messages from mobile nodes being respectively located in a small number of neighboring subnets of the subnet A.

The edge count value controller 625 also determines whether the amount of time, during which the edge AP determination unit 624 consecutively determines that the AP 62 is not an edge AP, reaches an edge threshold time, and reduces the edge count value when the amount of the time reaches the edge threshold time. The amount of time, during which the edge AP determination unit 624 consecutively determines that the AP 62 is not an edge AP, reaches an edge threshold time when there is no mobile node entering the subnet A from any one of the neighboring subnets for the edge threshold time, or when any mobile node entering the subnet A from the neighboring subnet(s) does not transmit the RS message for the edge threshold time. In particular, in the former case, the AP 62 is not an edge AP, and in the latter case, the AP 62 is an edge AP but a current transmission interval at which the RS message is transmitted is so short that the AP 62 need not transmit the RS message.

The RA transmission interval computing unit 626 computes the transmission interval of the RA message by the equation given below. In particular, the edge count value is initially set to 1, and when the transmission interval of the RA message is computed by the following equation, the edge count value controller 625 increases or reduces the edge count value of 1.

$$\text{RA transmission interval} = \text{basic transmission interval}/(\text{predetermined weight} \times \text{edge count value}) \quad (1)$$

That is, the RA transmission interval computing unit 626 computes the transmission interval of the RA message by dividing the basic transmission interval of the RA message by a product of the predetermined weight and the edge count value that is increased or reduced by the edge count value controller 625. Here, the basic transmission interval indicates a transmission interval of the RA message applied to a general AP according to the mobile internet protocol (MIP). The predetermined weight indicates a value that can be suitably adjusted for a wireless network environment according to an exemplary embodiment of the present invention. For example, if the load on communications established in the wireless network environment according to an exemplary embodiment of the present invention is great, the predetermined weight is set to a value larger than 1 so as to reduce the transmission interval of the RA message. If the load on the communications is not great, the predetermined weight is set to a value smaller than 1 so as to increase the transmission interval of the RA message.

When the wireless network interface 6210 receives an RS message, the RA elapsed time measurement unit 627 measures an amount of time elapsed from a point of time when the RA message stored in the AP 62 (the RA message stored in the RA storage unit 623) was received.

If the elapsed amount of time measured by the RA elapsed time measurement unit 627 is less than an elapsed threshold time, the RA/RS transmission determination unit 628 determines that the RA message stored in the RA storage unit 623 is to be transmitted to the mobile node transmitting the RS message. Also, if the elapsed amount of time is greater than the threshold time, the RA/RS transmission determination unit 628 determines that the RS message is to be transmitted to the AR 61 which is the original destination router. Here, the threshold time may be the transmission interval of the RA message computed by the RA transmission interval computing unit 626, or may be another value.

The wired network interface 629 periodically receives the RA message from the AR 61. Also, the wired network interface 629 selectively transmits the RS message to the AR 61 which is the original destination, based on the elapsed amount of time measured by the RA elapsed time measurement unit 627. In detail, when the RA/RS transmission determination unit 628 determines that the RS message is to be transmitted to the AR 61, the wired network interface 629 transmits the RS message from the mobile node to the AR 61. A wired broadcast method is performed to receive and transmit messages via the wired network interface 629, but it would be apparent to those of ordinary skill in the art that another method may be performed in this case.

The wireless network interface 6210 receives the RS message from a mobile node. Also, the wireless network interface 6210 transmits the RA message stored in the AP 62 (the RA message stored in the RA storage unit 623) to the mobile node during the transmission interval computed by the RA transmission interval computing unit 626.

However, when the message determination unit 621 determines that the RA message has been changed, the wireless network interface 6210 transmits the RA message during the basic transmission interval so that the mobile node can receive the RA message during the basic transmission interval according to the MIP, thereby allowing the apparatus of FIG. 6 to operate completely according to the MIP.

Also, the wireless network interface 6210 selectively transmits the RA message to the mobile node transmitting the RS message, based on the elapsed amount of time measured by the RA elapsed time measurement unit 627. More specifically, when the RA/RS transmission determination unit 628 determines that the RA message is to be transmitted, the wireless network interface 6210 transmits the RA message stored in the AP 62 (the RA message stored in the RA storage unit 623) to the mobile node. In general, a wireless broadcast method is used to transmit and receive messages via the wireless network interface 6210, but it would be apparent to those of ordinary skill in the art that another method may be performed in this case.

Figure 7:
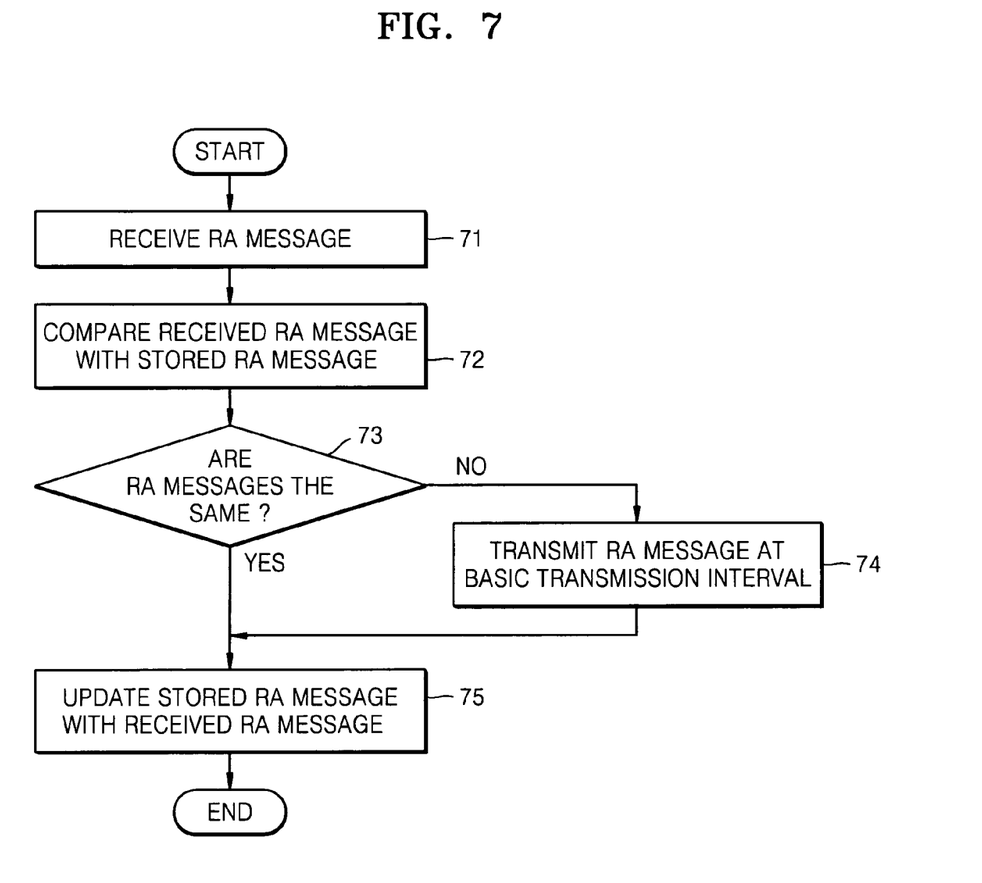
FIG. 7 is a flowchart illustrating a method of processing an RA message according to an exemplary embodiment of the present invention.

FIG. 7 is a flowchart illustrating a method of processing an RA message according to an exemplary embodiment of the present invention. Referring to FIG. 7, the method includes operations performed by the AP 62 illustrated in FIG. 6 according to time series. Thus, although not described here, the above operation of the AP 62 with reference to FIG. 6 is also applicable to the method of FIG. 7.

Referring to FIGS. 6 and 7, in operation 71, the AP 62 receives an RA message from the AR 61.

In operation 72, the AP 62 compares the RA message received in operation 71 with a RA message stored in the AP 62 (the RA message stored in the RA storage unit 623).

In operation 73, if the comparison result in operation 72 reveals that the RA messages are not the same, the AP 62 performs operation 74, and if the RA messages are the same, the AP 62 performs operation 75.

In operation 74, the AP 62 transmits the RA message during a basic transmission interval.

In operation 75, the AP 62 updates the RA message stored in the AP 62 (the RA message stored in the RA storage unit 623) with the RA message received in operation 71.

Figure 8:
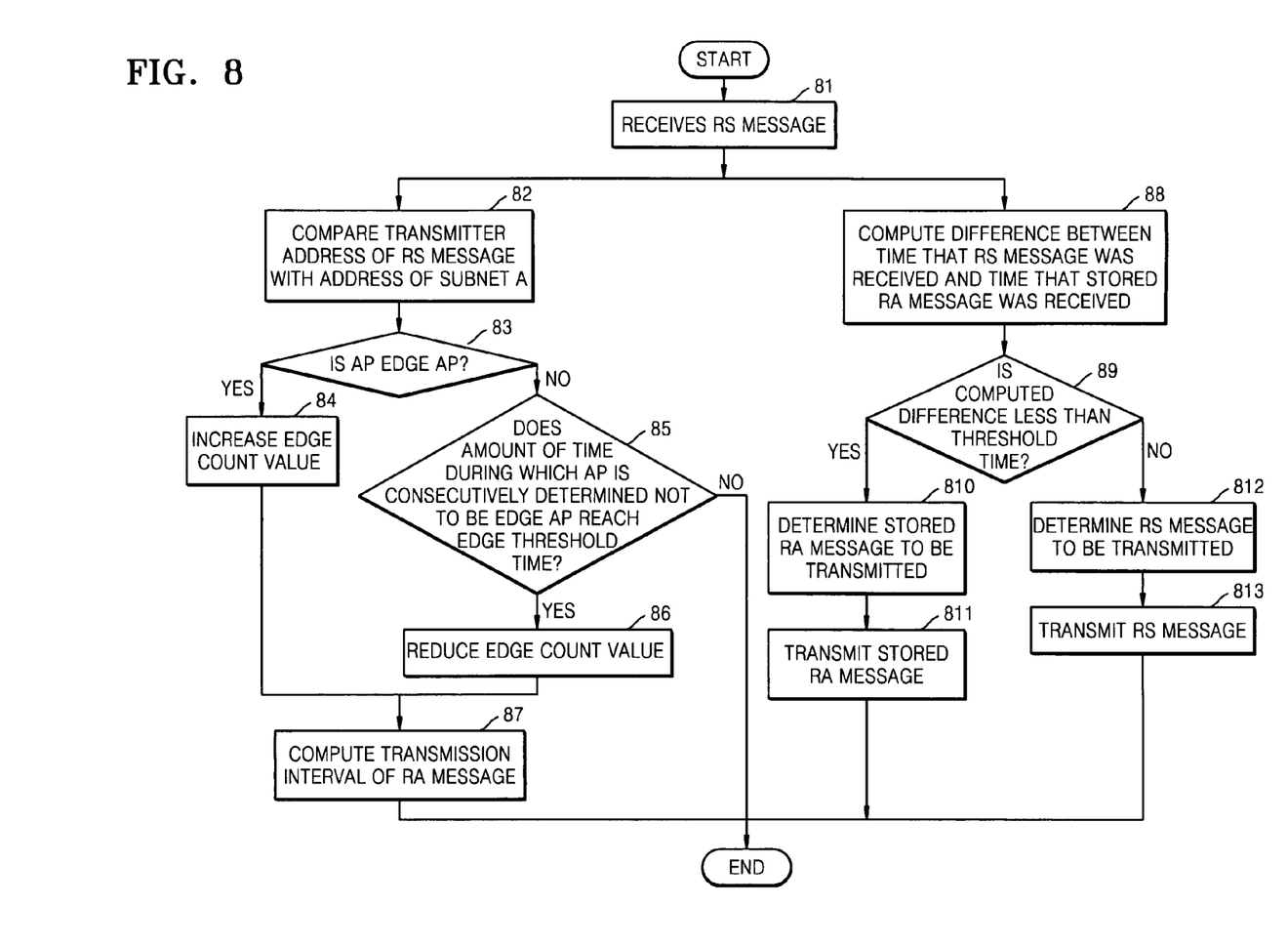
FIG. 8 is a flowchart illustrating a method of processing an RS message according to an exemplary embodiment of the present invention.

FIG. 8 is a flowchart illustrating a method of processing an RS message according to an exemplary embodiment of the present invention. Referring to FIG. 8, the method includes operations performed by the AP 62 illustrated in FIG. 6 according to time series. Thus, although not described here, the above operation of the AP 62 with reference to FIG. 6 is also applicable to the method of FIG. 8.

Referring to FIGS. 6 and 8, in operation 81, the AP 62 receives an RS message from the mobile node 63.

In operation 82, the AP 62 compares the address of a subnet via which the RS message received in operation 81 was transmitted with the address of a subnet A in which the AP 62 is located.

In operation 83, if the comparison result in operation 82 reveals that the addresses are not the same, the AP 62 determines the AP 62 as an edge AP being located at the boundary between the subnet A and a neighboring subnet, and performs operation 84. If the addresses are the same, the AP 62 performs operation 85.

In operation 84, the AP 62 increases an edge count value indicating the number of boundaries, between neighboring subnets and the subnet A, the AP 62 is located.

In operation 85, the AP 62 determines whether the amount of time during which the AP 62 is consecutively determined not to be an edge AP, reaches an edge threshold time. If the amount of time reaches the edge threshold time, the AP 62 performs operation 86. If the amount of time does not reach the edge threshold time, the method is completed.

In operation 86, the AP 62 reduces the edge count value.

In operation 87, the AP 62 computes a transmission interval of the RA message by dividing a basic transmission interval of the RA message by a product of a predetermined weight and the edge count value that is increased in operation 84 or reduced in operation 86.

Referring to FIG. 8, the following operations are performed together with operations 82 through 87.

In operation 88, the AP 62 measures an amount of time elapsed from a point of time when the RS message stored in the AP 62 (the RA message stored in the RA storage unit 623) was received.

In operation 89, the AP 62 determines whether the elapsed amount of time measured in operation 88 is less than an elapsed threshold time. The AP 62 performs operation 810 when the elapsed amount of time is less than the threshold time, and performs operation 812 when the elapsed amount of time is otherwise.

In operation 810, the AP 62 determines the RA message stored in the AP 62 (the RA message stored in the RA storage unit 623) is to be transmitted.

In operation 811, the AP 62 transmits the RA message stored in the AP 62 (the RA message stored in the RA storage unit 623) to the mobile node 63.

In operation 812, the AP 62 determines that the RS message from the mobile node 63 is to be transmitted to the AR 61 which is the original destination.

In operation 813, the AP 62 transmits the RS message to the AR 61.

Figure 9:
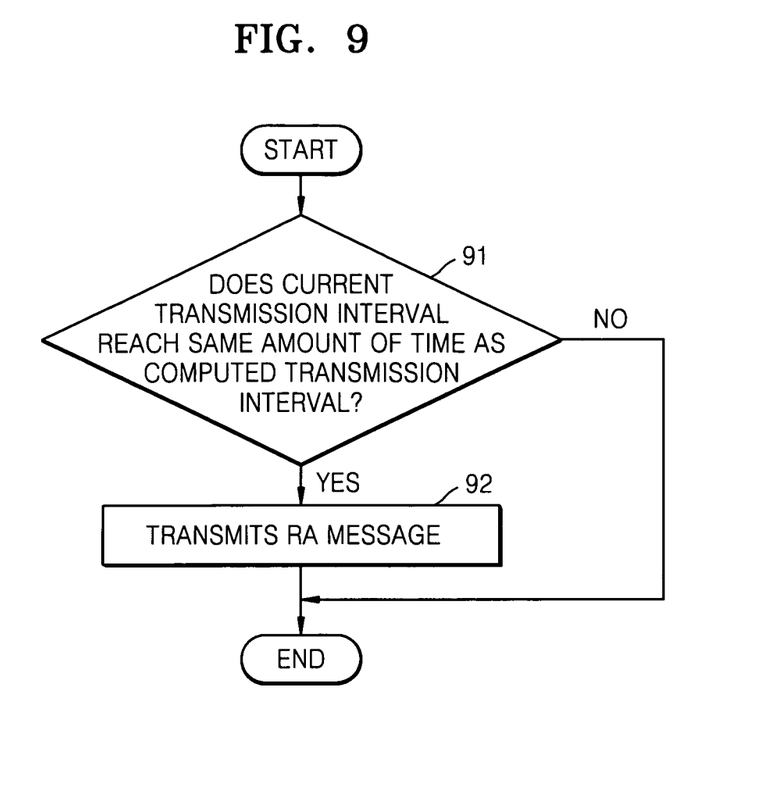
FIG. 9 is a flowchart illustrating a method of transmitting an RA message according to an exemplary embodiment of the present invention.

FIG. 9 is a flowchart illustrating a method of transmitting an RA message according to an exemplary embodiment of the present invention. Referring to FIG. 9, the method includes operations performed by the AP 62 of FIG. 6 according to timing series. Therefore, although not described here, the above operation of the AP 62 with reference to FIG. 6 is also applicable to the method of FIG. 9.

Referring to FIGS. 6 and 9, in operation 91, the AP 62 determines whether a current transmission interval of an RA message reaches the same amount of time as a transmission interval of a RA message computed by Equation (1). If the current transmission interval reaches the same amount of time as the computed transmission interval, operation 92 is performed. If the current transmission interval does not reach the same amount of time as the computed transmission interval, the method is completed.

In operation 92, the AP 62 transmits an RA message stored therein (the RA message stored in the RA storage unit 623) to a mobile node.

The above exemplary embodiments of the present invention may be embodied as a computer readable program, and realized in a general digital computer that can execute the program via a computer readable medium.

Examples of the computer readable medium include a magnetic storage medium (a ROM, a floppy disk, a hard disc, etc.), an optical recoding medium (a CD-ROM, a DVD, etc.), and even carrier waves (such as in transmission over the Internet).

According to an exemplary embodiment of the present invention, a transmission interval at which an RA message is transmitted is determined according to whether an AP is an edge AP. Therefore, the transmission interval is increased in a region in which handover is not likely to occur, and reduced in a region in which handover is likely to occur, thereby minimizing waste of wireless channel bandwidth and guaranteeing smooth handover in a mobile node. Accordingly, it is possible to efficiently use wireless resources and reduce a length of time needed for handover, thereby maximizing the throughput of the overall communications network.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of computing an interval of message transmission in an access point located in a specific subnet, the method comprising:
(a) at the access point, receiving a first message containing information regarding the specific subnet from at least one router;
(b) at the access point, determining whether the access point is an edge access point located at a boundary between the specific subnet and a neighbor subnet; and
(c) at the access point, computing, by a processor, the interval of transmission of the first message to at least one mobile node based on the determination result and an edge count value,
wherein the computing comprises computing a first interval of transmission of the first message when the access point is determined as the edge access point by the determining, and computing a second interval of transmission of the first message, greater than the first interval, when the access point is not determined as the edge access point by the determining, and
wherein the edge count value is a value that is increased each time when the access point determines that the access point is an edge access point, and is decreased each time when the access point determines that the access point is not the edge access point.

2. The method of claim 1, wherein during (b), whether the access point is the edge access point is determined based on information regarding a second message from a mobile node.

3. The method of claim 2, wherein during (b), whether the access point is the edge access point is determined based on a source address of the second message.

4. The method of claim 3, wherein, when the subnet of the source address is not the same as the specific subnet, the access point is determined as the edge access point.

5. The method of claim 2, wherein the first message is a router advertisement (RA) message according to a mobile Internet protocol (MIP) standard, and
the second message is a router solicitation (RS) message according to the MIP standard.

6. A method of computing an interval of message transmission in an access point located in a specific subnet, the method comprising:
(a) determining whether the access point is an edge access point located at a boundary between the specific subnet and a neighboring subnet; and
(b) computing, by a processor, the interval of transmission of a first message containing information regarding the specific subnet based on the determination result,
whenever the access point is determined as the edge access point, further comprising increasing an edge count value indicating a total number of boundaries, between neighboring subnets and the specific subnet, at which the access point is located,
wherein during (b), the interval of transmission is computed by dividing a basic interval of transmission of the first message by a product of a predetermined weight and the increased edge count value.

7. A method of computing an interval of message transmission in an access point located in a specific subnet, the method comprising:
(a) determining whether the access point is an edge access point located at a boundary between the specific subnet and a neighboring subnet; and
(b) computing, by a processor, the interval of transmission of a first message containing information regarding the specific subnet based on the determination result,
when the amount of time during which the access point is consecutively determined not to be the edge access point reaches a predetermined amount of time, further comprising reducing an edge count value indicating a total number of boundaries, between neighboring subnets and the specific subnet, at which the access point is located,
wherein during (b), the interval of transmission is computed by dividing a basic interval of transmission of the first message by a product of a predetermined weight and the reduced edge count value.

8. An apparatus for computing an interval of message transmission in an access point located in a specific subnet, the apparatus comprising:
a receiving unit which receives a first message containing information regarding the specific subnet from at least one router;

a determination unit which determines whether the access point is an edge access point located at a boundary between the specific subnet and a neighbor subnet; and a computing unit which computes the interval of transmission of the first message to at least one mobile node based on the determination result and an edge count value, wherein the computing unit computes a first interval of transmission of the first message when the access point is determined as the edge access point by the determining, and computing a second interval of transmission of the first message, greater than the first interval, when the access point is not determined as the edge access point by the determining, and wherein the edge count value is a value that is increased each time when the access point determines that the access point is an edge access point, and is decreased each time when the access point determines that the access point is not the edge access point.

9. A non-transitory computer readable medium having recorded thereon a computer program for executing a method of computing an interval of message transmission in an access point located in a specific subnet, the method comprising:

at the access point, receiving a first message containing information regarding the specific subnet from at least one router;

at the access point, determining whether the access point is an edge access point located at a boundary between the specific subnet and a neighbor subnet; and at the access point, computing, by a processor, the interval of transmission of the first message to at least one mobile node based on the determination result and an edge count value, wherein the computing comprises computing a first interval of transmission of the first message when the access point is determined as the edge access point by the determining, and computing a second interval of transmission of the first message, greater than the first interval, when the access point is not determined as the edge access point by the determining, and wherein the edge count value is a value that is increased each time when the access point determines that the access point is an edge access point, and is decreased each time when the access point determines that the access point is not the edge access point.

10. A method of transmitting a message in an access point located in a specific subnet, the method comprising:

at the access point, receiving a first message containing information regarding the specific subnet from at least one router;

at the access point, determining whether the access point is an edge access point located at a boundary between the specific subnet and a neighbor subnet;

at the access point, computing, by a processor, the interval of transmission of the first message, based on the determination result and an edge count value; and transmitting the first message at the computed interval to at least one mobile node, wherein the computing comprises computing a first interval of transmission of the first message when the access point is determined as the edge access point by the determining, and computing a second interval of transmission of the first message, greater than the first interval, when the access point is not determined as the edge access point by the determining, and wherein the edge count value is a value that is increased each time when the access point determines that the access point is an edge access point, and is decreased each time when the access point determines that the access point is not the edge access point.

11. An apparatus for transmitting a message in an access point located in a specific subnet, the apparatus comprising:

a receiving unit which receives a first message containing information regarding the specific subnet from at least one router;

a determination unit which determines whether the access point is an edge access point located at a boundary between the specific subnet and a neighbor subnet;

a computing unit which computes the interval of transmission of the first message, based on the determination result and an edge count value; and a transmitter which transmits the first message at the computed interval to at least one mobile node, wherein the computing unit computes a first interval of transmission of the first message when the access point is determined as the edge access point by the determining, and computing a second interval of transmission of the first message, greater than the first interval, when the access point is not determined as the edge access point by the determining, and wherein the edge count value is a value that is increased each time when the access point determines that the access point is an edge access point, and is decreased each time when the access point determines that the access point is not the edge access point.

12. A non-transitory computer readable medium having recorded thereon a computer program for executing a method of transmitting a message in an access point located in a specific subnet, the method comprising:

at the access point, receiving a first message containing information regarding the specific subnet from at least one router;

at the access point, determining whether the access point is an edge access point located at a boundary between the specific subnet and a neighbor subnet; and at the access point, computing, by a processor, the interval of transmission of the first message based on the determination result and an edge count value; and transmitting the first message at the computed interval to at least one mobile node, wherein the computing comprises computing a first interval of transmission of the first message when the access point is determined as the edge access point by the determining, and computing a second interval of transmission of the first message, greater than the first interval, when the access point is not determined as the edge access point by the determining, and wherein the edge count value is a value that is increased each time when the access point determines that the access point is an edge access point, and is decreased each time when the access point determines that the access point is not the edge access point.

* * * * *